(12) United States Patent
Endoh et al.

(10) Patent No.: US 8,703,248 B2
(45) Date of Patent: Apr. 22, 2014

(54) POLYCRYSTALLINE SILICON REACTOR

(75) Inventors: Toshihide Endoh, Suzuka (JP);
Masayuki Tebakari, Suzuka (JP);
Toshiyuki Ishii, Yokkaichi (JP);
Masaaki Sakaguchi, Suzuka (JP)

(73) Assignee: Mitsubishi Materials Corporation, Tokyo (JP)

( * ) Notice: Subject to any disclaimer, the term of this patent is extended or adjusted under 35 U.S.C. 154(b) by 620 days.

(21) Appl. No.: 12/406,335

(22) Filed: Mar. 18, 2009

(65) Prior Publication Data

US 2009/0238992 A1 Sep. 24, 2009

(30) Foreign Application Priority Data

Mar. 21, 2008 (JP) ................................. 2008-074469

(51) Int. Cl.
*B05D 5/06* (2006.01)
*C23C 16/00* (2006.01)

(52) U.S. Cl.
USPC ...... 427/543; 427/592; 427/255.28; 118/715; 118/725

(58) Field of Classification Search
None
See application file for complete search history.

(56) References Cited

U.S. PATENT DOCUMENTS

| | | | | |
|---|---|---|---|---|
| 2,149,003 | A | * | 2/1939 | Adam, Jr. ...................... 403/235 |
| 2,999,735 | A | * | 9/1961 | Reuschel ...................... 423/350 |
| 3,219,788 | A | | 11/1965 | Schweickert et al. |
| 3,227,855 | A | * | 1/1966 | Meyer, Sr. et al. ............. 219/384 |
| 4,495,399 | A | * | 1/1985 | Cann ........................ 219/121.59 |
| 4,715,317 | A | | 12/1987 | Ishizuka |
| 5,187,347 | A | * | 2/1993 | Leef .......................... 219/121.52 |
| 5,284,640 | A | * | 2/1994 | Jernegan et al. .............. 423/349 |

FOREIGN PATENT DOCUMENTS

| | | |
|---|---|---|
| EP | 2039653 A2 | 3/2009 |
| JP | 35-002982 | 3/1960 |
| JP | 2867306 | 6/1993 |
| JP | 2002-338226 A | 11/2002 |
| JP | 2007-107030 A | 4/2007 |

OTHER PUBLICATIONS

European Search Report dated Dec. 3, 2009, issued on the corresponding European Patent Application No. 09 15 5082.2.
Office Action mailed Feb. 5, 2013, issued for the Japanese Patent Application No. 2009-062559 and English translation thereof.

* cited by examiner

*Primary Examiner* — Bijay Saha
(74) *Attorney, Agent, or Firm* — Edwards Wildman Palmer LLP

(57) ABSTRACT

A polycrystalline silicon reactor which can prevent polycrystalline silicon which deposits on the surface of an electrode holding a silicon seed rod from being peeled off is provided. In a polycrystalline silicon reactor which applies an electric current to a silicon seed rod provided within a furnace, thereby heating the silicon seed rod, brings a source gas supplied into the furnace into reaction, and deposits polycrystalline silicon on the surface of the silicon seed rod, the reactor includes, at a bottom plate of the furnace, an electrode holder provided so as to be electrically insulated from the bottom plate, and a seed rod holding electrode connected to the electrode holder, and holding the silicon seed rod toward the upside. Concavo-convex portions exposed to a furnace atmosphere is provided at an outer peripheral surface of the seed rod holding electrode.

5 Claims, 4 Drawing Sheets

POLYCRYSTALLINE SILICON REACTOR

BACKGROUND OF THE INVENTION

1. Field of the Invention

The present invention relates to a polycrystalline silicon reactor to be used when producing polycrystalline silicon by the Siemens method.

Priority is claimed on Japanese Patent Application No. 2008-074469, filed Mar. 21, 2008, the content of which is incorporated herein by reference.

2. Description of Related Art

The Siemens method is known as a method of producing high-purity polycrystalline silicon to be used as a semiconductor material. This Siemens method is a production method of bringing a source gas composed of a mixed gas of chlorosilanes and hydrogen into contact with a heated silicon seed rod, and depositing the polycrystalline silicon on the surface of the seed rod by reaction of the source gas. As an apparatus which carries out this production method, a polycrystalline silicon reactor in which many silicon seed rods are stood is used. Generally, the silicon seed rods are connected by a connecting member at upper ends thereof to form in a Π-shape, and both lower ends thereof are fixed to electrodes which are installed at a furnace bottom of the reactor.

Thus, an electric current is applied to the whole silicon seed rods from the electrodes located at both ends, and the whole silicon seed rods are heated to about 1050° C. to 1100° C. which is the thermal decomposing temperature of the source gas by Joule's heat by the electric current. The source gas supplied into the furnace contacts the surfaces of the silicon seed rods heated in this way, and is thermally decomposed or hydrogen-reduced, whereby polycrystalline silicon is deposited on the surfaces of the silicon seed rods. As this reaction proceeds continuously, rod-like polycrystalline silicon grows up (for example, refer to Japanese Patent No. 2867306).

Meanwhile, in the process during which a source gas of chlorosilanes, such as trichlorosilane, reacts within the furnace, and polycrystalline silicon deposits on the surfaces of the silicon seed rods, the weight of the polycrystalline silicon which has been deposited on the electrodes reaches to tens of kilograms by continuing the reaction. Therefore, the silicon may be peeled off from the electrodes due to its own weight, and may damage the furnace bottom of the reactor. In addition, the peeled-off polycrystalline silicon may cause a hindrance to continuation of the reaction, for example, by causing short-circuiting between the electrodes and the furnace bottom.

SUMMARY OF THE INVENTION

The invention was made in view of such a problem, and an object of the invention is to provide a polycrystalline silicon reactor in which polycrystalline silicon which has been deposited on the surfaces of electrodes which hold silicon seed rods can support the self-weight of the rods, and can be prevented from being peeled off from the silicon seed rods.

In order to solve the above problem, the invention suggests the following means.

That is, the polycrystalline silicon reactor according to the invention is a polycrystalline silicon reactor which applies an electric current to a silicon seed rod provided within a furnace, thereby heating the silicon seed rod, brings a source gas supplied into the furnace into reaction, and deposits polycrystalline silicon on the surface of the silicon seed rod. The reactor includes, at a bottom plate of the furnace, an electrode holder which is provided so as to be electrically insulated from the bottom plate, and a seed rod holding electrode which is connected to the electrode holder and holds the silicon seed rod upward. Concavo-convex portions exposed to a furnace atmosphere is provided at an outer peripheral surface of the seed rod holding electrode.

Since concavo-convex portions are formed in the seed rod holding electrode, the surface area of the outer peripheral side surface of the seed rod holding electrode becomes larger compared with a case where there is no concavo-convex portion. Thus, the bonding interface between the seed rod holding electrode and the polycrystalline silicon can be increased, the seed rod holding electrode and the polycrystalline silicon can be more firmly bonded together, and the polycrystalline silicon can be effectively prevented from being peeled off from the seed rod holding electrode.

Additionally, in addition to the feature as described above, in the polycrystalline silicon reactor related to the present invention, an upper end of the seed rod holding electrode is provided with a tapered portion whose width decreases upward, and the taper angle of the tapered portion is equal to or more than 70° and equal to or less than 130°.

Here, if the taper angle of the tapered portion formed at the upper end of the seed rod holding electrode is less than 70°, the tapered portion has an upwardly thinly tapered shape, and becomes high in temperature due to Joule's heat generated by an electric current which flows through the seed rod holding electrode. Therefore, this heat is transferred beneath the male thread portion of the seed rod holding electrode, polycrystalline silicon tends to deposit over the upper and lower sides of the seed rod holding electrode, and the bonding interface between the seed rod holding electrode and the polycrystalline silicon becomes large. However, since the inclination of the tapered portion is steep, the strength of the seed rod holding electrode itself may degrade. Therefore, a problem that the tip of the electrode is damaged in a reaction process is caused.

Additionally, if the taper angle of the tapered portion exceeds 130°, the tapered portion does not become high in temperature compared with the case where the taper angle is small. Therefore, the polycrystalline silicon becomes difficult to grow on a portion below the tip of the seed rod holding electrode. The bonding interface between the seed rod holding electrode and the polycrystalline silicon becomes small, and consequently, the self-weight of the deposited polycrystalline silicon rod should be held with the small area. Therefore, a problem, such as fracture, occurs during growth of crystal. On the other hand, since the inclination does not become steep, the polycrystalline silicon which has deposited to the tapered portion becomes hard to be peeled off.

In the invention, in consideration of this, the taper angle of the tapered portion of the seed rod holding electrode is set to be equal to or more than 70° and equal to or less than 130°. Therefore, while the seed rod holding electrode is kept at high temperature, and polycrystalline silicon is easily deposited in the whole region of the outer peripheral side surface of the seed rod holding electrode, the inclination does not become excessively steep. Therefore, the polycrystalline silicon which has deposited on the tapered portion is not peeled off. Accordingly, it becomes possible to make the polycrystalline silicon reliably held by the seed rod holding electrode while the polycrystalline silicon is effectively deposited throughout the seed rod holding electrode.

A method of producing polycrystalline silicon related to the present invention is a method of producing polycrystalline silicon which applies an electric current to a silicon seed rod provided within a furnace, thereby heating the silicon seed rod, brings a source gas supplied into the furnace into reaction, and deposits polycrystalline silicon on the surface of the silicon seed rod. The method includes; providing concavo-convex portions exposed to a furnace atmosphere at an outer peripheral surface of a seed rod holding electrode holding the silicon seed rod upward; providing an electrode holder connected to the seed rod holding electrode so as to be electrically insulated from a bottom plate; and depositing the polycrystalline silicon on the silicon seed rod such that the polycrystalline silicon deposits on concavo-convex portions of the seed rod holding electrode.

By virtue of providing concavo-convex portions on the seed rod holding electrode, it is possible to make strong adhesion of the polycrystalline silicon to the seed rod holding electrode. Therefore, even if the reaction takes a long time, cracks or peeling off in the adjacent of the lower ends is suppressed, and then a stable production of the polycrystalline silicon can be performed.

According to the polycrystalline silicon reactor and the method of producing the polycrystalline silicon related to the invention, concavo-convex portions are provided in the whole region of the outer peripheral side surface of the seed rod holding electrode of the electrode installed at the polycrystalline silicon reactor. Hence, the polycrystalline silicon which deposits on the seed rod holding electrode can be prevented from being peeled off from the seed rod holding electrode.

DETAILED DESCRIPTION OF THE INVENTION

Figure 1:
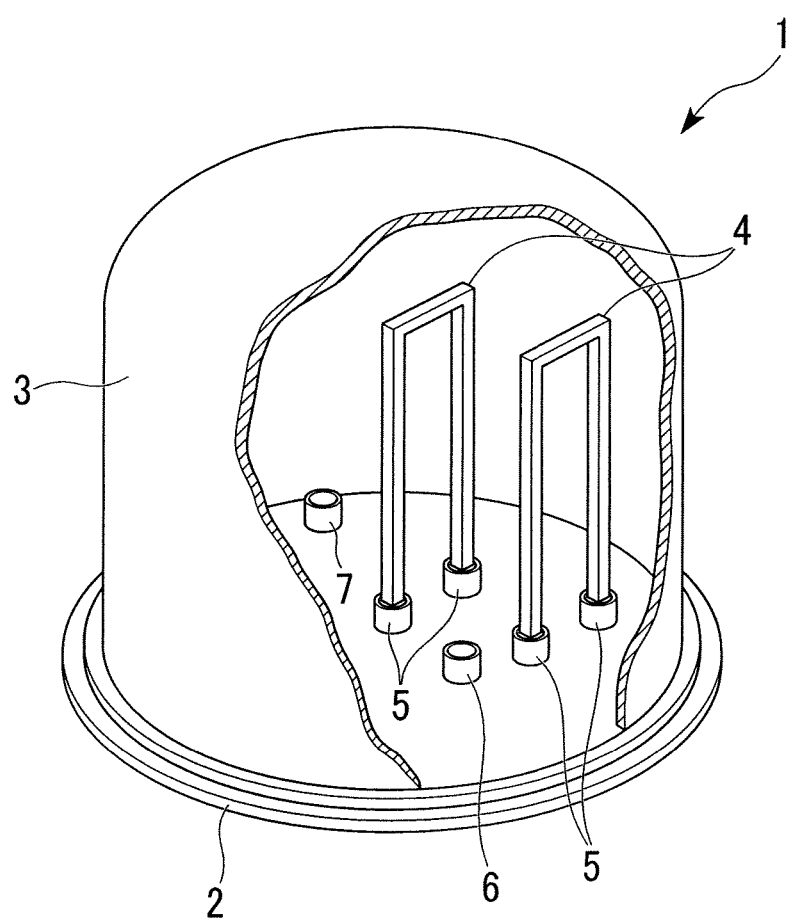
FIG. 1 is a schematic diagram of a polycrystalline silicon reactor according to a first embodiment.
Figure 2:
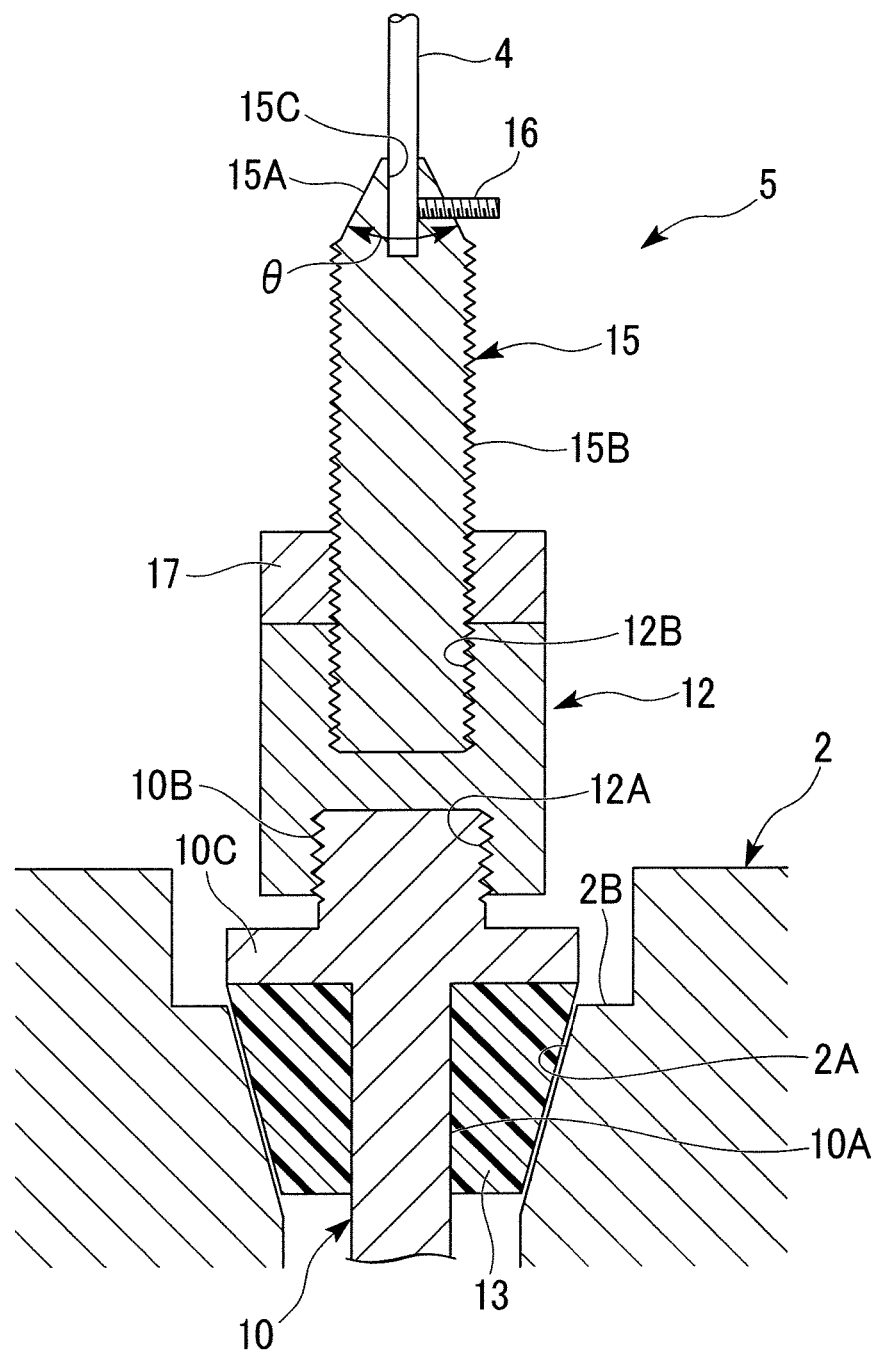
FIG. 2 is a sectional side view of an electrode according to the first embodiment.

Hereinafter, a polycrystalline silicon reactor and a method of producing polycrystalline that are a first embodiment of the invention silicon will be described with reference to the accompanying drawings. FIG. 1 is a schematic diagram of a polycrystalline silicon reactor according to a first embodiment, and FIG. 2 is a longitudinal sectional view of an electrode of the polycrystalline silicon reactor according to the first embodiment.

As shown in FIG. 1, a polycrystalline silicon reactor 1 according to this embodiment is provided with a bell jar 3 which has a bell shape so as to cover a whole upper region above a furnace bottom 2 which is installed in a circular shape, and the inside of the polycrystalline silicon reactor 1 is sealed by the furnace bottom 2 and the bell jar 3. In the inside sealed in this way, a plurality of silicon seed rods 4 as cores of generated polycrystalline silicon which are connected at their upper ends and are substantially Π-shaped are stood, and both base ends of each silicon seed rod 4 are supported by the electrodes 5 of the furnace bottom 2.

Additionally, a source gas supply port 6 which supplies a source gas composed of a mixed gas of chlorosilanes and hydrogen is provided at the furnace bottom 2 toward the silicon seed rods 4 inside the polycrystalline silicon reactor 1. A plurality of the source gas supply ports 6 is arranged at appropriate intervals so that a source gas can be uniformly supplied to the plurality of silicon seed rods 4. The source gas supply ports 6 are connected to a source gas supply line which is not shown. This source gas supply line leads to a supply source of a source gas through a flow regulating valve. Accordingly, the source gas is delivered to the source gas supply ports 6 through the source gas supply line, and is supplied to the inside of polycrystalline silicon reactor 1 while the amount supplied thereof is adjusted by the flow regulating valve.

Moreover, the furnace bottom 2 is provided with an exhaust port 7 for exhausting the reacted gas generated in the furnace of the polycrystalline silicon reactor 1. A plurality of the exhaust ports 7 is disposed at appropriate intervals so as to uniformly exhaust the gas after a reaction.

Hereinafter, the electrodes 5 in the polycrystalline silicon reactor 1 configured as described above will be described below in more detail.

As shown in FIG. 2, each electrode 5 has a substantially multi-stage columnar shape, and an electrode holder 10 to which an electric current is directly applied from a power source which is not shown is located at the lowermost portion of the electrode. The electrode holder 10 has a substantially columnar shape made of a corrosion-resistant material such as a stainless, hastelloy (registered trademark), and is disposed so as to pass through the furnace bottom 2 of the polycrystalline silicon reactor 1.

A substantially tubular insulating material 13 provided so as to fit to the outer peripheral side surface 10A of the electrode holder 10 is provided between an outer peripheral side surface 10A of the electrode holder 10 and an inner wall 2A of a through hole of the furnace bottom 2. Additionally, the electrode holder 10 is formed with an overhang portion 10C in contact with an upper end surface of the insulating material 13 and a portion above the overhang portion 10C is formed with a first male thread portion 10B.

In addition, a circular dent 2B which has the same center as the electrode holder 10 and the through hole is provided around the through hole of the furnace bottom 2 so as to be one step lower than the surface of the furnace bottom 2.

A female screw member 12 is disposed at an upper portion of the electrode holder 10. The female screw member 12 has a substantially columnar external diameter, a bottomed first female thread hole 12A is opened to a lower end surface of the female screw member, and a similarly bottomed second female thread hole 12B is opened to an upper end surface of the female screw member.

Also, as the first female thread hole 12A is screwed to the first male thread portion 10B of the electrode holder 10, the female screw member 12 and the electrode holder 10 are firmly fixed and integrated together such that their central axes are made to coincide with each other.

Also, the seed rod holding electrode 15 which holds the silicon seed rod 4 at its upper end is fixed to the upside of the female screw member 12.

The seed rod holding electrode 15 has a substantially columnar shape made of carbon, etc., and a second male thread portion (concavo-convex portion) 15B is formed throughout an outer peripheral side surface thereof. Additionally, a tapered portion 15A whose width decreases toward an upper end is formed at an upper part of the seed rod holding electrode 15.

Then, as the lower end of the second male thread portion 15B is screwed to the second female thread hole 12B of the female screw member 12, the seed rod holding electrode 15 is firmly fixed to and integrated with the female screw member 12.

In addition, in this embodiment, the taper angle θ of the tapered portion 15A is set to be equal to or more than 70° and equal to or less than 130°.

Additionally, the seed rod holding electrode 15 is fixed to the female screw member 12 in this way, and only a portion of a lower end of the second male thread portion 15B of the seed rod holding electrode 15 is inserted and screwed to the second female thread hole 12B of the female screw member 12. Therefore, most of the seed rod holding electrode 15 protrudes from an upper portion of the female screw member 12, and the second male thread portion 15B is exposed at the outer peripheral side surface of the seed rod holding electrode.

Moreover, an opening 15C having a predetermined depth is opened at the tip of the tapered portion 15A of the seed rod holding electrode 15, and one end of the silicon seed rod 4 is held by the opening 15C. In addition, a locking screw 16 is inserted and fitted through a screw hole provided at the lateral side of the tapered portion 15A, and the silicon seed rod 4 is pressed from the lateral side by the locking screw 16 and is firmly held by the seed rod holding electrode 15.

Also, a cylindrical lock nut 17 having the same inner diameter as the female screw member 12 is mounted on the upper side of the female screw member 12, and fixes the seed rod holding electrode 15.

In the electrodes 5 as described above, the silicon seed rod 4 is energized and heated by an electric current applied to the seed rod holding electrode 15, and the deposition reaction of polycrystalline silicon is performed. In addition, since the female screw member 12, and the seed rod holding electrode 15 are all made of carbon, they do not cause contamination within the furnace.

Additionally, since the second male thread portion 15B of the seed rod holding electrode 15 is screwed to the second female thread hole 12B of the female screw member 12 and thereby firmly fixed thereto, the seed rod holding electrode 15 does not accidentally come out from the female screw member 12.

Also, since concavo-convex portions are formed on the second male thread portion 15B in the seed rod holding electrode 15, the surface area of the outer peripheral side surface of the seed rod holding electrode 15 becomes larger compared with a case where there is no concavo-convex portion. Thus, the bonding interface between the seed rod holding electrode 15 and the polycrystalline silicon can be increased, the seed rod holding electrode 15 and the polycrystalline silicon can be more firmly bonded together, and the polycrystalline silicon can be effectively prevented from being peeled off from the seed rod holding electrode 15.

Here, if the taper angle θ of the tapered portion 15A formed at the upper end of the seed rod holding electrode 15 is less than 70°, the tapered portion 15A has an upwardly thinly tapered shape, and the tapered portion 15A becomes high in temperature due to Joule's heat generated by an electric current which flows through the seed rod holding electrode 15. Therefore, this heat is transferred beneath the male thread portion 15B of the seed rod holding electrode 15, polycrystalline silicon tends to deposit over the upper and lower sides of the seed rod holding electrode 15, and the bonding interface between the seed rod holding electrode 15 and the polycrystalline silicon becomes large. On the other hand, since the inclination of the tapered portion 15A is steep, the polycrystalline silicon which has deposited on the tapered portion 15A may be easily peeled off.

Additionally, if the taper angle θ of the tapered portion 15A exceeds 130°, the tapered portion does not become high in temperature compared with the case where the taper angle θ is small. Therefore, it becomes difficult for the polycrystalline silicon to grow below the seed rod holding electrode 15, and the bonding interface between the seed rod holding electrode 15 and the polycrystalline silicon becomes small. Therefore, it is necessary to hold the polycrystalline silicon with a smaller area, and then cracks are likely to occur in the adjacent of the seed rod holding electrode 15 during the reaction or during cooling after the reaction process.

In consideration of this, in the polycrystalline silicon reactor 1 in this embodiment, the taper angle θ of the tapered portion 15A of the seed rod holding electrode 15 is set to be equal to or more than 70° and equal to or less than 130°. Therefore, while the seed rod holding electrode 15 is kept at high temperature, and polycrystalline silicon is easily deposited in the whole region of the male thread portion 15B formed at the outer peripheral side surface of the seed rod holding electrode 15, the inclination does not become excessively steep. Therefore, the polycrystalline silicon which has deposited to the tapered portion 15A is not peeled off. Accordingly, it becomes possible to make the polycrystalline silicon reliably held by the seed rod holding electrode 15 while the polycrystalline silicon is effectively deposited throughout the seed rod holding electrode 15.

Figure 4:
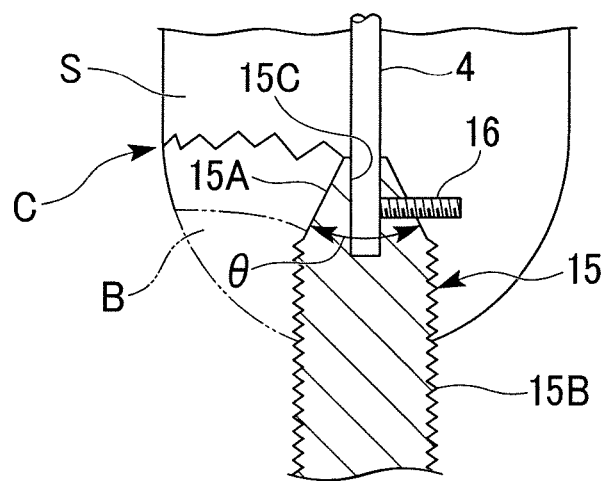
FIG. 4 is a sectional schematic diagram showing peeling off and cracks generated in the deposited polycrystalline silicon.

The method of producing the polycrystalline silicon of the present invention is a method of supplying trichlorosilane and hydrogen as source gases in the furnace and reacting the source gas on the silicon seed rods 4, thereby depositing the polycrystalline silicon. Silicon seed rods 4 are supported by the seed rod holding electrode 15 provided with concavo-convex portions in the outer surface. The electrode holder 10 holding the seed rod holding electrode 15 is provided in a bottom plate 2 (furnace bottom) and electrically insulated from the furnace bottom 2. As shown in FIG. 4, the deposited polycrystalline silicon S adheres not only to silicon seed rods 4 but also to concavo-convex portions 15B in the seed rod holding electrode 15. As described above, since the polycrystalline silicon S adheres firmly to concavo-convex portions 15B in the seed rod holding electrode 15, generation of cracks are reduced in the adjacent of the lower end of the polycrystalline silicon S and peeling off is suppressed, even if the reaction takes a long time. As a result, a stable production of the polycrystalline silicon can be performed.

Here, ratios of cracks C or peeling off B generated in the deposited polycrystalline silicon S as shown in FIG. 4 will be explained in Examples 1 to 4, Comparative Examples 1 to 2, and Comparative Example 3 in which the seed rod holding electrode in which the concavo-convex portions in the outer surface is not formed is used. In Examples 1 to 4 and Comparative Examples 1 to 3, the seed rod holding electrodes 15 in which the taper angles of the tapered portions 15A are various are used. In Examples and Comparative Examples, the polycrystalline silicon S is deposited in the polycrystalline silicon reactor 1 under the production conditions as shown in Table 1. The adhesion situation of the polycrystalline silicon S in the adjacent of the seed rod holding electrode 15 is observed and generation of peeling off B and cracks is measured. Ratios of generation of peeling off B and cracks C in each Example and Comparative Example are shown in Table 2.

TABLE 1

| Production conditions | | |
|---|---|---|
| Source gas | Trichlorosilane | 216-228 t |
| | Hydrogen | 273,000-288,000 m$^3$ |
| Reaction time | | 114-119 hours |

TABLE 1-continued

Production conditions

| | |
|---|---|
| Outer diameter of rod-like polycrystalline silicon | 118-124 mm |

TABLE 2

| | Examples | | | | Comparative examples | | |
|---|---|---|---|---|---|---|---|
| | 1 | 2 | 3 | 4 | 1 | 2 | 3 |
| Taper angle θ (deg) | 70 | 90 | 110 | 130 | 50 | 150 | 90 |
| Concavo-convex portions in the outer surface | Yes | Yes | Yes | Yes | Yes | Yes | No |
| Ratio of generation of cracks (%) | 1.3 | 1.0 | 1.7 | 2.0 | 2.0 | 2.3 | 2.3 |
| Ratio of generation of peeling off (%) | 1.0 | 0.3 | 0.6 | 1.2 | 1.8 | 0.9 | 2.4 |

As shown in Table 2, Comparative Example 1, in which the angle θ of the taper portion 15A is 50°, has a high ratio of generation of cracks and peeling off compared to Example 1 to 4, in which the angles θ of the taper portions 15A are in the range of 70° to 130°. In Comparative Example 2, in which the angle θ of the taper portion 15A is 150°, has a high ratio of generation of cracks although a ratio of generation of peeling off is relatively low. From this result, it is confirmed that a preferable angle of taper portions 15A is in the range of 70° to 130°.

In comparative example 3, in which the seed rod holding electrode in which the concavo-convex portions in the outer surface is not formed is used, ratios of generation of cracks and peeling off are high. From this result, it is confirmed that providing concavo-convex portions is effective for preventing generations of cracks and peeling off.

Next, an electrode 20 in a second embodiment of the invention will be described with reference to a drawing.

Figure 3:
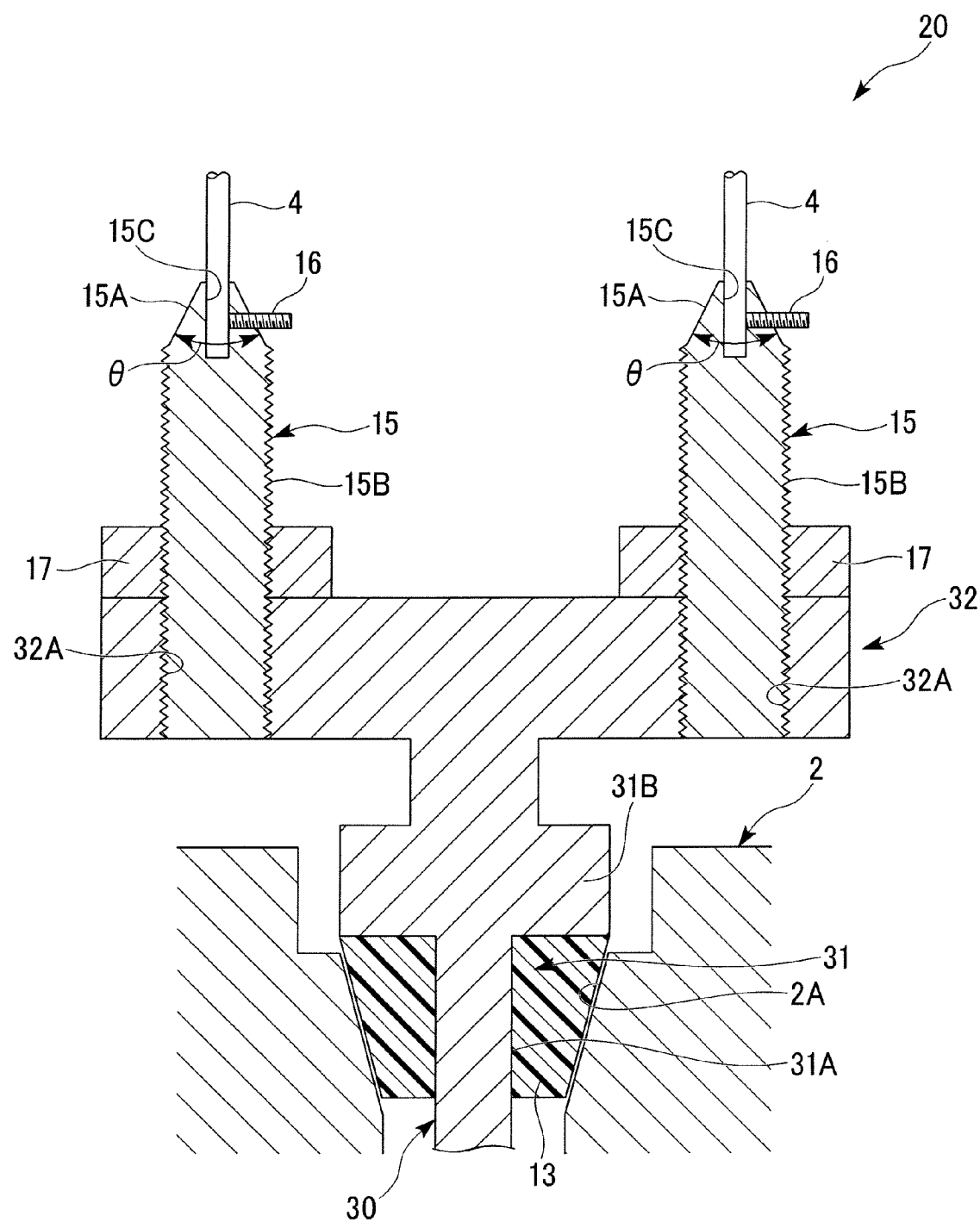
FIG. 3 is a sectional side view of an electrode according to the second embodiment.

FIG. 3 is a longitudinal sectional view of an electrode 20 of a polycrystalline silicon reactor according to a second embodiment. The electrode 20 of this embodiment is different from the first embodiment in that the electrode is a so-called double holder type electrode 20 which supports two silicon seed rods 4, 4, while the electrode 5 in the first embodiment supports the single silicon seed rod 4. In addition, the same components in FIG. 3 as those of the first embodiment shown in FIG. 2 will be denoted by the same reference numerals, and a detailed description thereof will be omitted.

The electrode holder 30 is made of a corrosion-resistant material such as a stainless, hastelloy (registered trademark), has a stood portion 31 which extends in a vertical direction, and a supporting portion 32 which extends horizontally of the stood portion 31 at an upper end of the stood portion 31, and is T-shaped in side view as a whole.

The stood portion 31 is disposed so as to pass through the furnace bottom 2 of the polycrystalline silicon reactor 1, and has an electric current applied directly thereto from a power source at a lowermost end thereof.

A substantially tubular insulating material 13 provided so as to fit to the outer peripheral side surface 31A of an electrode holder 30 is provided between an outer peripheral side surface 31A of the stood portion 31 and an inner wall 2A of a through hole of the furnace bottom 2. Additionally, the stood portion 31 is formed with an overhang portion 31B in contact with an upper end surface of the insulating material 13.

Female thread holes 32A which pass through the supporting portion 32 in the vertical direction are opened in the adjacent of both longitudinal ends of the supporting portion 32. Also, second male thread portions 15B of the seed rod holding electrodes 15 are fixed so as to be inserted into and screwed to female thread holes 32A, respectively, and thereby, a pair of seed rod holding electrodes 15 are disposed in parallel at regular intervals in a horizontal direction above the supporting portion 32.

Similarly to the first embodiment, the seed rod holding electrodes 15 are mounted with lock nuts 17, respectively, fixing seed rod holding electrodes 15 firmly to the supporting portion 32.

Even in such an electrode 20 of the second embodiment, the same functions and effects as the electrode 5 of the first embodiment are accomplished. Additionally, since the electrode holder 30 is formed in a T-shape and can support the two seed rod holding electrodes 15, it becomes possible to effectively utilize a space in the furnace and to efficiently install the silicon seed rods 4.

Although the embodiments of the polycrystalline silicon reactor and the method of producing the polycrystalline silicon that are the invention have been described hitherto, the invention is not limited thereto, and can be suitably changed without departing from the technical idea thereof.

For example, although the taper portion of the seed rod holding electrodes is a flat surface in circular cone in the embodiment, concavo-convex shape may be applied as same manner as second male thread portions 15B. In addition, since concavo-convex portions is not limited to triangular thread shape as male thread portions 15B in the embodiment, concavo-convex portions may be concavo-convex shape, which is formed by line such as rectangle or corrugation.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A polycrystalline silicon reactor in which an electric current is applied to a silicon seed rod provided within a furnace, thereby heating the silicon seed rod, a source gas supplied into the furnace is brought into reaction, and polycrystalline silicon is deposited on the surface of the silicon seed rod, comprising;
   at a bottom plate of the furnace, an electrode holder provided so as to be electrically insulated from the bottom plate,
   a seed rod holding electrode connected to the electrode holder, and holding the silicon seed rod upward, wherein a concavo-convex portions exposed to a furnace atmosphere is provided at an outer peripheral surface of the seed rod holding electrode, and
   a cylindrical lock nut screwed on the concavo-convex portion of the seed rod holding electrode and surrounding a portion of the seed rod holding electrode for fixing the seed rod holding electrode, wherein
   an upper end of the seed rod holding electrode is provided with a tapered portion whose width decreases upward, and the taper angle of the tapered portion is equal to or more than 70° and equal to or less than 130°, an outer surface of the seed rod holding electrode exposed to the furnace atmosphere is composed of the tapered portion and the concavo-convex portions, and a lower boundary of the tapered portion is directly connected with an upper boundary of the concavo-convex portions.

2. The polycrystalline silicon reactor according to claim 1, wherein the concavo-convex portions exposed to a furnace atmosphere is provided along most of the outer peripheral surface of the silicon seed rod holding electrode.

3. The polycrystalline silicon reactor according to claim 1, wherein the concavo-convex portions exposed to a furnace atmosphere is provided along the outer peripheral surface of the silicon seed rod holding electrode not including the tapered portion.

4. The polycrystalline silicon reactor according to claim 1, wherein the cylindrical lock nut has concavo-convex portions respective to the concavo-convex portions provided at the outer peripheral surface of the silicon seed rod holding electrode and connects to both the silicon seed rod holding electrode and the electrode holder.

5. The polycrystalline silicon reactor according to claim 1, wherein the silicon seed rod holding electrode comprises:

an opening at the tip of the tapered portion of the silicon seed rod holding electrode, one end of the silicon seed rod being held by the opening; and a locking screw, which is inserted and fitted through a screw hole provided at the lateral side of the tapered potion; and the silicon seed rod is pressed from the lateral side by the locking screw.

* * * * *